(12) United States Patent
Sastry et al.

(10) Patent No.: US 8,381,849 B2
(45) Date of Patent: Feb. 26, 2013

(54) VEHICLE HYBRID ENERGY SYSTEM

(75) Inventors: Ann M. Sastry, Ann Arbor, MI (US);
Kimberly A. Cook-Chennault, Princton Junction, NJ (US); Chia W. Wang, Ann Arbor, MI (US); Fabio Albano, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 901 days.

(21) Appl. No.: 12/059,385

(22) Filed: Mar. 31, 2008

(65) Prior Publication Data
US 2008/0245587 A1    Oct. 9, 2008

Related U.S. Application Data

(60) Provisional application No. 60/909,395, filed on Mar. 30, 2007.

(51) Int. Cl.
*B60K 6/28* (2007.10)
(52) U.S. Cl. .................... 180/65.21; 903/907
(58) Field of Classification Search ........... 180/65.1, 180/65.21, 65.29, 68.5; 429/99; 320/121, 320/124
See application file for complete search history.

(56) References Cited

U.S. PATENT DOCUMENTS

| | | | | |
|---|---|---|---|---|
| 3,987,352 | A * | 10/1976 | Hirota | 320/101 |
| 4,056,764 | A * | 11/1977 | Endo et al. | 320/101 |
| 5,154,985 | A * | 10/1992 | Tanaka | 429/9 |
| 5,162,164 | A * | 11/1992 | Dougherty et al. | 429/9 |
| 5,998,960 | A | 12/1999 | Yamada et al. | |
| 6,406,812 | B1 * | 6/2002 | Dreulle et al. | 429/99 |
| 6,713,988 | B2 * | 3/2004 | Dubac et al. | 320/121 |
| 6,737,822 | B2 | 5/2004 | King | |
| 6,969,567 | B1 | 11/2005 | Higley et al. | |
| 7,038,463 | B2 * | 5/2006 | Cooper et al. | 324/538 |
| 7,839,116 | B2 * | 11/2010 | Esaka et al. | 320/103 |
| 2003/0094928 | A1 | 5/2003 | Emori et al. | |
| 2007/0269714 | A1 * | 11/2007 | Watanabe et al. | 429/120 |
| 2010/0087961 | A1 * | 4/2010 | Velez | 700/292 |

FOREIGN PATENT DOCUMENTS

JP    2000-182676 A    6/2000

OTHER PUBLICATIONS

Hu Li et al., "A Natural ZVS Medium-Power Bidirectional DC-DC Converter with Minimum Number of Devices;" IEEE Transactions on Industry Applications; vol. 39, No. 2, Mar.-Apr. 2003. pp. 525-535.
International Search Report in corresponding international application No. PCT/US08/058940 issued Jun. 30, 2008.
Written Opinion in corresponding international application No. PCT/US08/058940 issued Jun. 30, 2008.
Office Action from the Japan Patent Office, for Japanese Patent Application No. 2010-501288, filed on Sep. 11, 2012.
European Search Report and Written Opinion for PCT/US2008058940 dated Nov. 26, 2012.

* cited by examiner

*Primary Examiner* — J. Allen Shriver, II
*Assistant Examiner* — Bridget Avery
(74) *Attorney, Agent, or Firm* — Richard T. Ogawa; Ogawa P.C.

(57) ABSTRACT

A hybrid energy storage system suitable for use in a vehicle having an electrified drivetrain includes a first energy storage module and a second energy storage module that is different than the first energy storage module. The first energy storage module may have a cell configuration, a cell chemistry, a cell number, a controller or another characteristic different than a like characteristic of the second energy storage module.

14 Claims, 2 Drawing Sheets

VEHICLE HYBRID ENERGY SYSTEM

CROSS-REFERENCE TO RELATED APPLICATIONS

This application claims priority to and benefit from U.S. Provisional Patent Application Ser. No. 60/909,395, filed Mar. 30, 2007, entitled Vehicle Hybrid Battery System, the disclosure of which is hereby incorporated herein by reference for all purposes.

GOVERNMENT FUNDING

The U.S. Government may have certain rights in this invention as provided for by the terms of Contract No. EEC 9986686 awarded by The National Science Foundation—Wireless Integrated Microsystems Engineering Research Center (NFS-WIMS ERC).

TECHNICAL FIELD

This patent relates to energy storage systems. More particularly, this patent relates to energy storage systems for electric and hybrid electric vehicles, and in particular, to a hybrid energy storage system suitable for use in vehicles having a total or partial electrified drivetrain and other applications, such as residential electric.

BACKGROUND

The design of an electrical energy storage system for an electrified drivetrain of an electric or hybrid electric vehicle poses significant challenges. Existing vehicle electrical energy storage systems, primarily single chemistry lead-acid, nickel metal hydride, lithium and the like are inadequate. Other electrical energy storage technology, such as employed in small scale applications like consumer electronics, can inform the design of energy storage systems for electrified drivetrain leaves many questions unanswered. The suggestion of a battery structure, i.e., chemistry, cell configuration, construction, size and shape, suitable for consumer electronics, for example, may not scale to provide a solution to the vehicle energy storage system designer.

Design issues including cell and module robustness, safety, aging, lifetime, thermal effects, material/shelf life, shock and vibration resistance and general suitability in a vehicle environment all come into play. Issues of system scale also exist. Load requirements in a consumer electronic device may be in the micro- or milliamp range with power delivery at less than one Watt. Electrified drivetrain systems may demand power delivery in the 5-30 kiloWatt hour range at 300-400 volts and significantly higher load current. A vehicle environment is also an extreme use environment subjecting the system to temperature extremes, changing temperature ranges, shock and vibration and, of course, crashes. Costs including initial installation and future replacement are also of concern. Selection and usage of materials should be made with a view toward sustainability, i.e., use of materials that are fundamentally abundant and reusable.

The typical energy storage/battery system of electric (EV), hybrid electric (HEV) or plug-in hybrid (PHEV) electric vehicle is limited to a single chemistry and cell architecture. To meet the many diverse operating conditions the vehicle might experience, the designer necessarily compromises in selecting the battery system. The resulting drawbacks are less than optimal energy delivery, volumetric size, weight and operating complexity (number and configuration of cells, cell monitoring for health and failure, etc.).

SUMMARY OF THE INVENTION

In accordance with embodiments of the herein described invention, an electric energy storage scheme for a pure electrified (EV) or partially electrified vehicle (such as HEV) is capable of responding to diverse operating conditions by providing multiple active chemistries cells/batteries, taking full advantage of various superior performances of each individual active chemistry. Without limiting the generality of the invention and to assist in its understanding, the following terminologies are used. A single cell is the smallest unit of the energy storage device, including a positive electrode, a negative electrode and electrolyte. The positive and negative electrodes contain active chemicals, which are responsible for the main reaction, along with additives to improve the overall cell performance. A battery/module may include one or more cells arranged in parallel or in series. A hybrid battery system may include two or more active chemistries with different modules, to accommodate, for example, extremely high/low temperatures, sharp acceleration, or variable speeds, etc. "Modules" refer to subsystems of batteries/cells in series/parallel, in various packing configuration. Different active chemistries have their own optimal operating conditions.

In exemplary embodiments of the invention, the electric hybrid power source utilizes two different active chemistries of battery modules, each of which may include one of more cells. However, this invention is not limited to two different chemistries only. The cells of the battery modules could be primary (non-rechargeable) or secondary (rechargeable) cells of high gravimetric energy, and relatively low and stable internal resistance over time. The two modules could be arranged in series or in parallel via a charge control circuit. The charge control circuit will monitor the power profile and operating temperature required by the vehicle cruising conditions, and then will determine which module or both modules would be implemented, based on the current, voltage, energy and operating temperature ranges of the battery modules, in a manner to optimize overall system output.

Embodiments of the invention offer the potential to maximize the cruising distance throughout the service. When the electric vehicle is driven in a low load state, the electric power required for driving the motor is mainly supplied from the higher energy battery among the pack to maximize the cruising distance. When the load of the electric vehicle increases and greater power is required, higher power battery will be used.

Embodiments of the invention offer the further potential to maximize the operational temperature conditions. When the environmental temperature, for example, is altered, batteries having superior performance under that condition, will be used.

Embodiments of the invention also offer the potential to prolong the lifetime of the hybrid battery system, while accommodating demand for wide range of output power characteristics, from a low load to a high load, by charging the high gravimetric power (W/kg) battery with the electric power supplied from the high gravimetric energy (Wh/kg) battery, which always generates a constant output power. The electric power of the high power battery is used to drive the vehicle when fluctuation of the load is large, while the electric power of the high energy battery, which is capable of sustaining a constant output for a long time, is used to drive the auxiliary machines in which fluctuation of the load is small. In this manner, the possible travel distance can be extended and the size of the electric power system can be reduced. Further, the electric power system can respond to a wide range of output power demands, from a low load to a high load, and the driving characteristics can be improved.

Numerous advantages and novel features of the present invention are described in the following detailed description of the invention, and accompanying drawings.

DETAILED DESCRIPTION

Significant improvement in energy storage system performance for electric vehicle (EV), hybrid electric vehicle (HEV) and plug-in hybrid electric vehicle (PHEV) applications can be attained by abandoning single architecture storage systems in favor of a hybrid approach. A hybrid energy storage system may be generically thought of as a system containing two or more different energy storage structures. For example, a hybrid energy storage system may incorporate two different battery chemistries and corresponding cell configurations. By optimization of the hybrid energy storage system, reductions can be obtained in the overall size, weight, cell number and control complexity with improvement in energy delivery and system life. An energy storage system with multiple modules. Modules may include set of cells having certain characteristics, such as cell configuration, cell chemistry, controls and the like. Combining modules of different types may allow improved energy delivery, over a wider range of operating conditions. For example, one module may be optimized for short duration, high load conditions while another module may be optimized for long duration, low load conditions. Together, the system may better meet the energy requirements of the electrified drivetrain.

Figure 1:
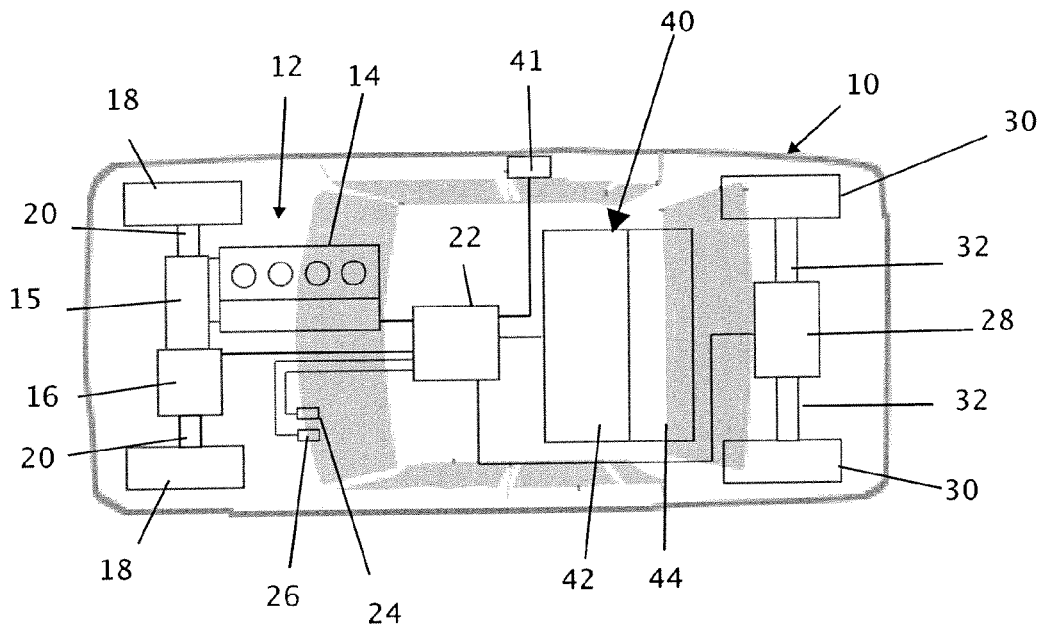
FIG. 1 is a schematic diagram of vehicle including an electrified drivetrain and associated electrical energy storage system.

FIG. 1 is schematic of a vehicle 10 incorporating an electrified drivetrain 12, and in particular a hybrid electrified drivetrain. Embodiments of the present invention have application to virtually any vehicle incorporating a completely electrified (EV) or partially electrified (HEV) drivetrain including plug-in type electrified drivetrains. The vehicle 10 is illustrated and described only as a single possible implementation of an embodiment of the present invention. It is understood that numerous other configurations of the vehicle 10 and the electrified drivetrain 12 are possible. For example, 42 and 44 are not limited to be installation in the same compartment. They could be arranged in different locations, such that they could be more easily accessible to target electronic devices, such as an air conditioner, DC motor, etc.

The electrified drivetrain 12 includes an internal combustion engine 14 coupled to a variable speed transmission 15 and traction motor 16 to drive the front wheels 18 of the vehicle 10 via propulsion shafts 20. The transmission 15 and the traction motor 16 are coupled to a controller 22 responsive to inputs from an accelerator control 24 and a brake control 26 accessible to the vehicle operator. While FIG. 1 depicts a single traction motor 16 coupled to the transmission 15, multiple traction motors may be used, for example one each associated with the wheels 18. As FIG. 1 depicts, a traction motor 28 may be provided to drive rear wheels 30 via propulsion shafts 32, the traction motor 28 being coupled to the controller 22. Alternative configurations of the electrified drivetrain 12 may provide for primary driving of the rear wheels 30 via the transmission 15 and traction motor 16, driving of the front wheels 18 and the rear wheels 30 and various combinations driving the front wheels 18 and/or the rear wheels 30 via a variable speed transmission and traction motors.

Electric energy is supplied to the traction motor 16 and the traction motor 28 (if provided) from a hybrid energy storage system 40 via the controller 22. In accordance with embodiments of the invention, the hybrid energy storage system 40 includes a plurality of energy storage modules, two are illustrated as energy storage module 42 and energy storage module 44. The hybrid energy storage system 40 may incorporate more than two energy storage modules. Modules may be a set of cells having specific characteristics, such as cell configuration, cell chemistry, control and the like.

Electric energy may be provided to the hybrid energy storage system 40 by operating the traction motor 16 in a generating mode driven by the internal combustion engine 14. Energy may further be recovered and delivered to the hybrid energy storage system 40 during vehicle breaking by operating the traction motor 16 and/or traction motor 28 in a regenerative breaking mode. Energy also may be provided to the hybrid energy storage system 40 via a plug-in option via a plug-in interface 41.

In an embodiment, the hybrid energy storage system 40 is a hybrid battery system that incorporates a first battery system portion or module 42 and a second battery system or module 44. The first module 42 may have a first battery architecture and the second module 44 may have a second battery architecture, different than the first battery architecture. Different battery architecture is meant to refer to any or all of cell configuration, cell chemistry, cell number, cell size, cell coupling, control electronics, and other design parameters associated with that portion of the battery system that may be different than the same parameter when viewed against the corresponding portion or portions. It may be preferable to have the battery pack to be located near certain electronic devices. Hence, 42 and 44 may not be necessarily installed in the same compartment as 40.

Figure 2:
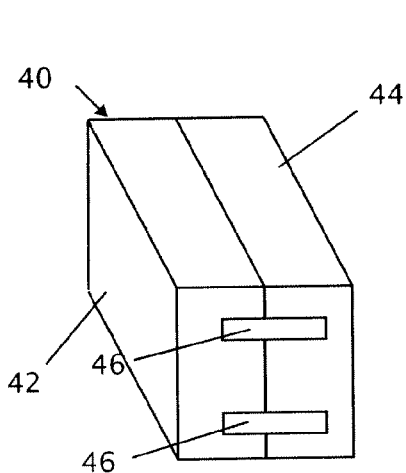
FIG. 2 is a schematic illustration of an electrical energy storage system including a first energy storage module and a second energy module in accordance with embodiments of the invention.

FIG. 2 depicts the modules 42 and 44 as packaged entities that may be electrically coupled by conductive straps 46 to provide a single output. The modules 42 and 42 may be coupled either in series or in parallel as required by the intended application. A preferred design may be determined through the system integration analysis.

Figure 3:
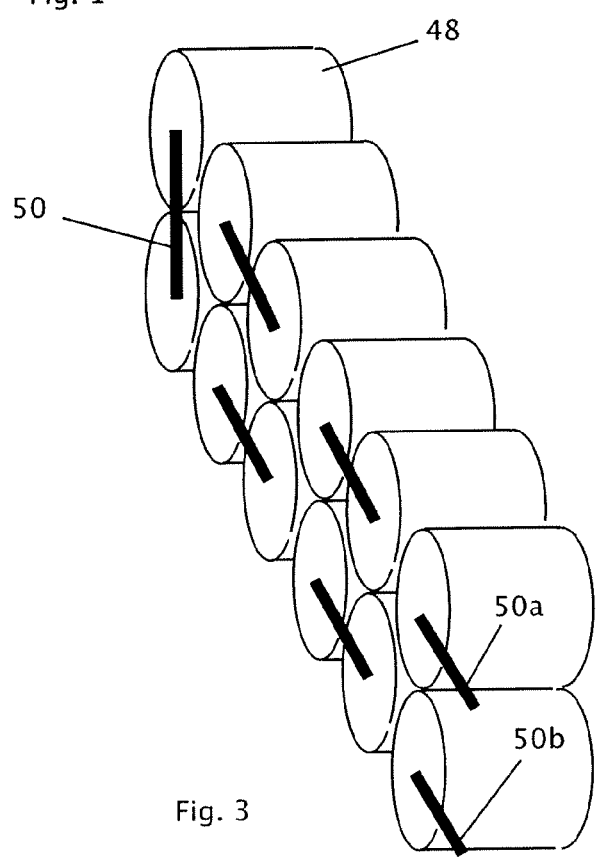
FIG. 3 is a schematic illustration of an energy storage module, illustrating individual battery cells forming the energy storage module.
Figure 5:
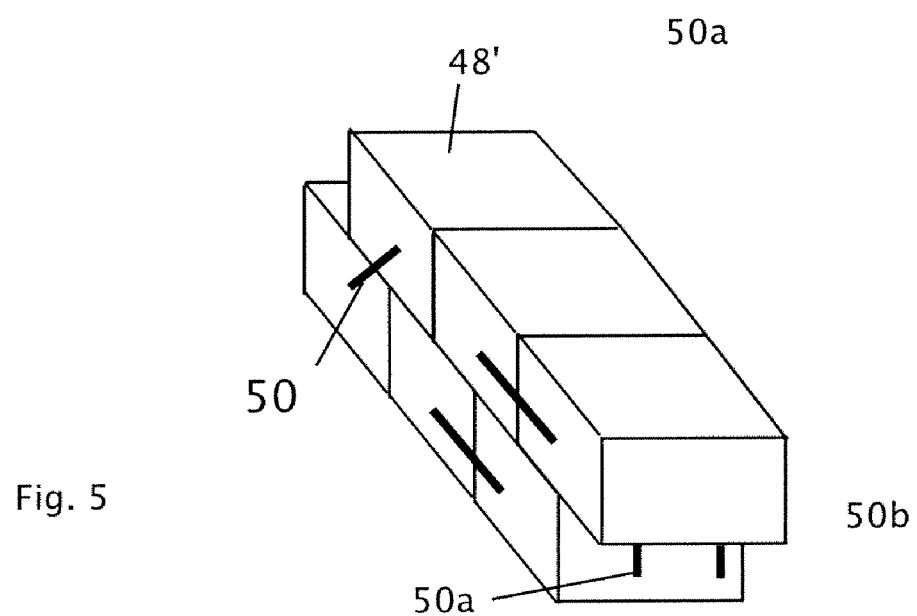
FIG. 5 is a schematic illustration of an energy storage module, illustrating individual battery cells forming the energy storage module.

As depicted in FIG. 3, a module, such as either the module 42 or the module 44 may be an assembly of individual cells 48 (one denoted) coupled by conductive straps 50 (one denoted). As depicted, the cells 48 have a cylindrical form and may be of any suitable chemistry, such as nickel metal-hydride; lithium or the like. However, the cells may be of virtually any chemistry including lead acid, lithium free, silver, zinc and emerging chemistries including chemistries not yet understood or characterized provided that they are later capable of being characterized. Lithium-ion (Li-ion) battery and nickel metal hydride (Ni-MH) batteries are two preferred systems due to their high gravimetric power (150 W/kg vs. 85 W/kg), and wide operating environmental temperature, (−40~65° C. vs. −30~65° C.) The cells 48 also need not have cylindrical form but may have a prismatic or any other suitable form. FIG. 5 depicts a plurality of cells 48' (one denoted) having a prismatic form, series coupled by straps 50'.

Alternative to the cells 48 being batteries, the cells 48 may be virtually any electrical energy storage device. Therefore, as an alternative to chemical cells, the cells 48 may be capacitors or other structures capable of storing electrical energy. The cells may alternatively be energy producing cells, such as micro fuel cells or the like. A preferred alternative would be high energy storage/power generation device.

Figure 4:
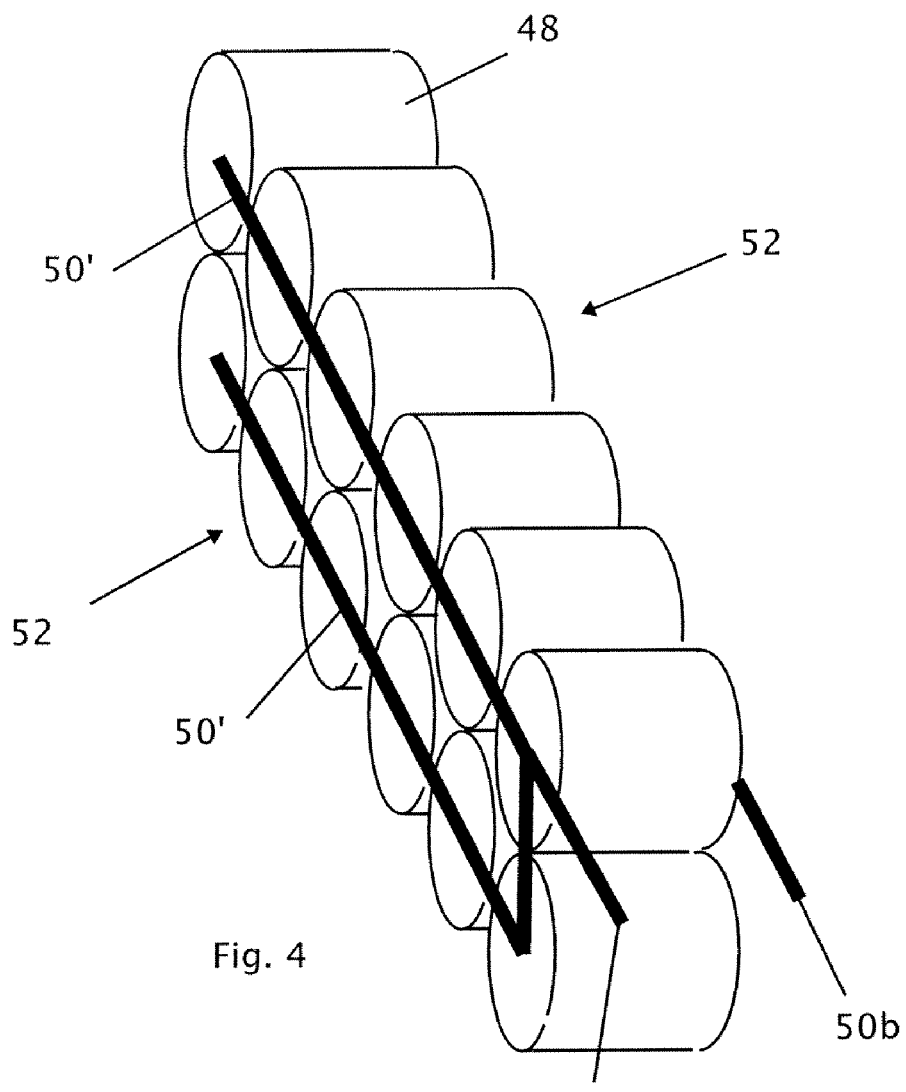
FIG. 4 is a schematic illustration of an energy storage module, illustrating individual battery cells forming the energy storage module.

FIG. 3 depicts the cells 48 series coupled by the conductive straps 50 in a single string that may be tapped at terminals 50a and 50b. However, the cells may be parallel coupled or combinations of parallel and series coupled. FIG. 4, for example, illustrates groups 52 of the cells 48 that are parallel coupled by conductive straps 50'. The groups 52 of cells 48 may then be series coupled and tapped at the terminals 50a and 50b or otherwise coupled to provide an output. Each of FIGS. 3-5 depict a plurality of cells, in practice each of the modules 42 and 44 may have significantly more cells than depicted, and each module may have dozens or even hundreds of cells. Therefore, within a single module forming a hybrid energy storage system, individual cells may be joined in series, in parallel and/or in combinations of series and parallel. Groups of cells may be joined in series with the groups then being joined in parallel. Groups of cells may be joined in parallel with the groups then being joined in series. All combinations of series and parallel coupling of individual cells and groups of joined cells are possible within each storage module. Likewise, the storage modules may then be joined in series, parallel and/or in combinations of series and parallel or separately coupled to the electrified drivetrain 12.

Numerous parameters may be employed in the specification of energy storage system 12, the modules 42 and 44 and ultimately the components, such as the cells 48, assembled to form a module. Many of the parameters, but not necessarily all such parameters are described by Cook, et al., *POWER (power optimization for wireless energy requirements): A MATLAB based algorithm for design of hybrid energy systems*, Journal of Power Sources 159 (2006) 758-780 and are not repeated. Parameters may include: power profile, cell profile, cell volume, cell mass, capacity fade, lifetime, energy, weighted power, volumetric energy, volumetric power, weighted volumetric power, gravimetric energy, weighted gravimetric energy and/or rate of discharge. An optimization process may focus upon or factor one or more of these parameters including consideration of several of the parameters on their own and in combination with other parameters. For example, a designer may specify target values for one or more of mass, volume and surface area, operation temperature, numbers of modules, number of cycles, primary and/or secondary cell chemistry as the optimization parameters. Preferred optimization parameters include the smallest number of batteries, the lowest total mass of the battery system, the highest gravimetric energy, and the highest gravimetric power.

A suitable optimization approach may account for form factor, energy and gravimetric power, lifetime and environmental conditions. One or more of the various parameters may be set as constraints. For example, the power profile, system volume or system mass may be constrained with remaining defining parameters subject to optimization. The resulting system, in accordance with embodiments of the invention, may include two or more modules with distinct chemistry, cell arrangement and coupling (parallel or serial), control electronics (amplifiers, buffers, converters, etc.), volume or mass to achieve needed operational energy delivery for system operation. As illustrated in FIG. 1 the volume of the module 42 is larger than the volume of the module 44 to illustrate at least one difference between the module 42 and the module 44. Other differences between the modules 42 and 44 may and likely will exist between the modules 42 and 44, as described.

To illustrate further potential differences between the modules 42 and 44 by way of a specific, non-limiting example, and referring again to FIG. 1, the module 42 may be an assembly of Ni cells 48 each having a nickel-metal hydride (Ni-MH) chemistry. The module 44 may have a lithium ion (Li-ion) chemistry utilizing a number N2 of cells. The values N1 and N2 may be the same or different. Each portion may be optimized for individual power and/or performance requirements, or alternatively, optimized to operate together to provide superior overall performance to that of a single architecture. For example, as compared to a traditional battery system for the vehicle 10, the hybrid battery system 12 may represent reductions in mass and volume while meeting the energy requirements of the electrified drivetrain. Traditionally, only a single battery chemistry is used. Hence, the designer is limited by the chosen battery's characteristics, such as the energy/gravimetric power, limiting voltage and current. The reduction due to usage of hybrid battery systems as proposed in this invention is due to separating the energy sources based on the power characteristics of each battery system instead of only selecting a single electrochemistry. A higher gravimetric energy battery system would reduce total mass and volume significantly compared to a monolithic system. A high gravimetric power battery system would be used for occasional high power operating conditions.

Table 1 illustrates the energy requirements, mass and volume for a proposed electric vehicle battery pack, with the mass and volume taking into account a traditional design approach using a single cell architecture based on ~6800 lithium cobalt oxide ($LiCoO_2$) cells type 18650. Using a hybrid energy storage system incorporating two modules, an almost 46% reduction in the mass can be achieved. The first module may include ~2,005 lithium iron phosphate (LiFePO4) cylindrical cells type 18650 and the second module may include ~4,780 lithium manganese oxide ($LiMn_2O_4$) cells type 18650. The resulting hybrid energy total mass is 290 kg and total volume is 115 L, and total number of cell is 6,785, as compared to the original system requirements. Furthermore, the estimated lifetime of the hybrid battery pack would be almost double that of a traditional design, while the cost of traditional design would be $28,000 compared to $58,000 with hybrid battery systems.

TABLE 1

| Electrified Drivetrain Requirements | |
| --- | --- |
| Voltage | 375.0 |
| Peak Power (Watts/kg) | 444.44 |
| Volume (L) | 116 |
| Mass (kg) | 450.0 |

The foregoing example is provided to illustrate advantages of hybrid energy storage systems in accordance with embodiments of the invention, and should not be taken to be limiting of the invention. Many other examples may be envisioned meeting the requirements of the described system or meeting different system requirements.

While the invention is described in terms of several preferred embodiments of mounting assemblies that may be used in connection with fault protection devices, it will be appreciated that the invention is not limited to such devices. The inventive concepts may be employed in connection with any number of devices and structures. Moreover, while features of various embodiments are shown and described in combination, the features may be implemented individually each such single implementation being within the scope of the invention.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. A hybrid energy storage system configured for a vehicle having a partial or completely electrified drivetrain, the hybrid energy storage system comprising:
    a first energy storage module and a second energy storage module coupled in series, the first energy storage module being different from the second energy storage module, each of the first and second storage modules including a cell or a set of cells having common specific characteristics that include cell configuration, cell chemistry, and control, the first energy storage module providing electrochemistry and control distinct from those of the second energy storage module,
    whereupon the first energy storage module is configured by a plurality of first energy target parameters, the first energy target parameters including a cell volume, a cell mass, a gravimetric energy, a gravimetric power, a volumetric energy, a volumetric power, a rate of discharge, operation temperature, and number of cycles for the first energy storage module; and
    whereupon the second energy storage module is configured by a plurality of second energy target parameters, the second energy target parameters including a cell volume, a cell mass, a gravimetric energy, a gravimetric power, a volumetric energy, a volumetric power, a rate of discharge, operation temperature, and number of cycles for the second energy storage module.

2. The hybrid energy system of claim 1, wherein the first energy storage module contains batteries made from a first set of active materials, and the second energy storage module contains batteries made from a second set of active materials.

3. The hybrid energy storage system of claim 1, wherein the first energy storage module and the second energy storage module are coupled to provide a single output that is coupled to the electrified drivetrain.

4. The hybrid energy storage system of claim 1, wherein the first energy storage module has a first cell configuration, and the second energy storage module has a second cell configuration, the first cell configuration being different from the second cell configuration, and wherein the first cell configuration is a first form factor, and the second cell configuration is a second form factor.

5. The hybrid energy storage system of claim 1, wherein a first cell chemistry of the first energy storage module and a second cell chemistry of the second energy storage module are selected from the group consisting of nickel metal hydride (Ni-MH) and lithium-ion.

6. The hybrid energy storage system of claim 1, wherein the first energy storage module comprises a first plurality of battery cells, and the second energy storage module comprises a second plurality of battery cells, the second plurality of battery cells having different configuration and number than the first plurality of battery cells.

7. The hybrid energy storage system of claim 1, wherein the first energy storage module comprises a plurality of batteries, and the second energy storage system comprises a plurality of capacitors.

8. A hybrid energy storage system configured for a vehicle having a partial or completely electrified drivetrain, the hybrid energy storage system comprising:
    a control module;
    a first energy storage module coupled to the control module, the first energy storage module comprising a first electrochemistry configuration, the first electrochemistry configuration comprising a plurality of first electrochemical cells;
    a second energy storage module coupled to the control module and coupled in series to the first energy storage module, the second energy storage module comprising a second electrochemistry configuration, the second electrochemistry configuration comprising a plurality of second electrochemical cells, the first energy storage module being different from the second electrochemistry configuration; and
    the drivetrain coupled to the control module and being configured to be electrified by at least the first energy storage module or the second energy storage module;
    whereupon the first energy storage module is configured by a plurality of first energy target parameters, the first energy target parameters including a cell volume, a cell mass, a gravimetric energy, a gravimetric power, a volumetric energy, a volumetric power, a rate of discharge, operation temperature, and number of cycles for the first energy storage module; and
    whereupon the second energy storage module is configured by a plurality of second energy target parameters, the second energy target parameters including a cell volume, a cell mass, a gravimetric energy, a gravimetric power, a volumetric energy, a volumetric power, a rate of discharge, operation temperature, and number of cycles for the second energy storage module.

9. The hybrid energy storage system of claim 8, wherein the first electrochemical cells are made from a first set of active materials, and the second electrochemical cells are made from a second set of active materials.

10. The hybrid energy storage system of claim 8, wherein the first energy storage module and the second energy storage module are coupled to provide a single output to the electrified drivetrain.

11. The hybrid energy storage system of claim 8, wherein the first electrochemistry configuration is a first form factor, and the second electrochemistry configuration is a second form factor.

12. The hybrid energy storage system of claim 8, wherein the first electrochemistry configuration is selected from one of a nickel metal hydride (Ni-MH) or lithium-ion; and wherein the second electrochemistry configuration is selected from one of a nickel metal hydride (Ni-MH) or lithium-ion.

13. The hybrid energy storage system of claim 8, wherein the first energy storage module comprises a plurality of first battery cells, and the second energy storage module comprises a plurality of second battery cells, whereupon a first number of the plurality of first battery cells is different from a second number of the plurality of second battery cells.

14. The hybrid energy storage system of claim 8, further comprising a plurality of capacitors.

* * * * *